(12) United States Patent
Kapur et al.

(10) Patent No.: US 9,183,549 B2
(45) Date of Patent: Nov. 10, 2015

(54) SYSTEM AND METHOD OF SECURE PAYMENT TRANSACTIONS

(75) Inventors: Shashi Kapur, Fort Lauderdale, FL (US); Gary Palmer, Fort Lauderdale, FL (US)

(73) Assignee: MTS Holdings, Inc., Purchase, NY (US)

( * ) Notice: Subject to any disclaimer, the term of this patent is extended or adjusted under 35 U.S.C. 154(b) by 846 days.

(21) Appl. No.: 12/547,771

(22) Filed: Aug. 26, 2009

(65) Prior Publication Data

US 2010/0057623 A1   Mar. 4, 2010

Related U.S. Application Data

(60) Provisional application No. 61/091,895, filed on Aug. 26, 2008, provisional application No. 61/186,564, filed on Jun. 12, 2009.

(51) Int. Cl.
| | |
|---|---|
| G06Q 20/00 | (2012.01) |
| G06Q 20/14 | (2012.01) |
| G06Q 20/12 | (2012.01) |
| G06Q 20/32 | (2012.01) |
| G06Q 20/40 | (2012.01) |

(Continued)

(52) U.S. Cl.
CPC .............. *G06Q 20/14* (2013.01); *G06Q 20/12* (2013.01); *G06Q 20/325* (2013.01); *G06Q 20/3224* (2013.01); *G06Q 20/40* (2013.01); *G06Q 20/4012* (2013.01); *G06Q 20/4014* (2013.01); *G06Q 20/425* (2013.01); *G07F 7/1025* (2013.01)

(58) Field of Classification Search
USPC .......................................................... 705/64
See application file for complete search history.

(56) References Cited

U.S. PATENT DOCUMENTS

| | | | |
|---|---|---|---|
| 5,357,563 A | 10/1994 | Hamilton et al. | |
| 5,920,847 A | 7/1999 | Kolling et al. | |
| 6,751,299 B1 * | 6/2004 | Brown et al. | ............... 379/88.18 |

(Continued)

FOREIGN PATENT DOCUMENTS

| | | |
|---|---|---|
| CA | 2542988 | 10/2007 |
| EP | 1615183 | 1/2006 |

(Continued)

OTHER PUBLICATIONS

International Search Report dated Jan. 7, 2010 issued in corresponding International Application No. PCT/US2009/055015.

(Continued)

*Primary Examiner* — Dante Ravetti
(74) *Attorney, Agent, or Firm* — Toering Patents PLLC

(57) ABSTRACT

A system and method for secure payment transactions is provided. The system may include an adaptive payment server including one or more processors configured to receive a first communication including first identification information from a first communication device on a first communication channel. The adaptive payment server may identify a second communication device based on the first identification information and initiate a second communication to the second communication device on a second communication channel, which may be discrete from the first communication channel. The adaptive payment server may receive second identification information from the second communication device on the second communication channel and authenticate the payment transaction using the first identification information and the second identification information.

23 Claims, 7 Drawing Sheets

(51) Int. Cl.
  *G06Q 20/42* (2012.01)
  *G07F 7/10* (2006.01)

(56) References Cited

U.S. PATENT DOCUMENTS

| | | | |
|---|---|---|---|
| 7,089,214 B2* | 8/2006 | Wang | 705/64 |
| 7,349,884 B1* | 3/2008 | Odom et al. | 705/40 |
| 2002/0032649 A1 | 3/2002 | Selvarajan | |
| 2002/0069165 A1* | 6/2002 | O'Neil | 705/40 |
| 2002/0073024 A1 | 6/2002 | Gilchrist | |
| 2002/0169966 A1* | 11/2002 | Nyman et al. | 713/182 |
| 2003/0004889 A1* | 1/2003 | Fiala et al. | 705/64 |
| 2003/0046094 A1 | 3/2003 | Singh et al. | |
| 2004/0054632 A1 | 3/2004 | Remy | |
| 2004/0254868 A1 | 12/2004 | Kirkland et al. | |
| 2005/0015345 A1 | 1/2005 | Yao et al. | |
| 2005/0256806 A1* | 11/2005 | Tien et al. | 705/64 |
| 2006/0271496 A1 | 11/2006 | Balasubramanian et al. | |
| 2006/0273158 A1* | 12/2006 | Suzuki | 235/380 |
| 2007/0022058 A1* | 1/2007 | Labrou et al. | 705/67 |
| 2007/0107017 A1* | 5/2007 | Angel et al. | 725/62 |
| 2007/0107044 A1* | 5/2007 | Yuen et al. | 726/2 |
| 2007/0220275 A1 | 9/2007 | Heitzeberg et al. | |
| 2007/0226495 A1 | 9/2007 | Kim et al. | |
| 2007/0265064 A1 | 11/2007 | Kessman et al. | |
| 2008/0086770 A1* | 4/2008 | Kulkarni et al. | 726/20 |
| 2008/0120214 A1 | 5/2008 | Steele et al. | |
| 2008/0130842 A1* | 6/2008 | Johri et al. | 379/88.04 |
| 2008/0133390 A1 | 6/2008 | Scipioni | |
| 2008/0317220 A1* | 12/2008 | Perkins et al. | 379/88.02 |
| 2009/0178120 A1 | 7/2009 | Royyuru et al. | |
| 2009/0300745 A1 | 12/2009 | Dispensa | |
| 2010/0057623 A1 | 3/2010 | Kapur et al. | |
| 2010/0250955 A1 | 9/2010 | Trevithick et al. | |
| 2012/0223133 A1* | 9/2012 | Miller et al. | 235/379 |
| 2012/0246080 A1* | 9/2012 | Bajan | 705/71 |

FOREIGN PATENT DOCUMENTS

| | | |
|---|---|---|
| EP | 1755062 | 2/2007 |
| EP | 2034432 | 3/2009 |
| WO | WO 2004/049621 | 6/2004 |
| WO | WO 2010/140876 | 12/2010 |

OTHER PUBLICATIONS

European Search Report dated Jul. 10, 2012 issued in counterpart/related European application (No. 09812043.9).

Written Opinon of the International Searching Authority dated Sep. 17, 2012 issued in related PCT application (No. PCT/US2012/042188).

International search report dated Sep. 17, 2012 issued in PCT counterpart application (No. PCT/US2012/042188).

* cited by examiner

SYSTEM AND METHOD OF SECURE PAYMENT TRANSACTIONS

CROSS-REFERENCE TO RELATED APPLICATIONS

This application claims priority to U.S. Provisional Patent Application Ser. No. 61/091,895 entitled "Enable PIN Debit Transactions at Internet Based Online Merchants by Using a Combination of IVR and Hardware Security Module," filed on Aug. 26, 2008 and U.S. Provisional Patent Application Ser. No. 61/186,564 entitled "Payment Authentication Services," filed on Jun. 12, 2009 and is related to co-pending U.S. patent application Ser. No. 12/547,783 entitled "System and Method of Recurring Payment Transactions," filed concurrently herewith, all of which are hereby incorporated by reference herein in their entireties.

FIELD OF THE INVENTION

The invention relates to processing payment card transactions, including credit, debit and prepaid payment cards, using an Interactive Voice Response system combined with a Hardware Security Module to prompt for, retrieve, and encrypt a Personal Identification Number for secure payment transactions.

BACKGROUND OF THE INVENTION

Electronic payment systems generally include methods to reduce security risks for individuals and entities conducting automatic payments from a checking or savings account and/or other financial transactions including paying with payment cards over the Internet and in traditional brick-and-mortar establishments. However, retailers and recurring billers According to various implementations of the invention, who maintain personal details, bank account information and other payment information, are vulnerable to hacking or other security breaches which cause the unlawful distribution of identify and financial information to the detriment of consumers, retailers and financial institutions causing financial harm to these entities and undermining trust in the payment system. Existing systems have employed various security measures such as signature verification for brick-and-mortar stores, PIN pads for the entry of debit cards PIN in brick-and-mortar stores and security codes printed on credit card for online transactions. However, these systems are not applicable for Internet purchases or recurring bill payments by payment card and fail to adequately secure payment transactions. Signature verification relies on the retailer or other recipient to verify the cardholder's signature while an identity thief having possession of the credit card may circumvent the security code measures.

One effective approach to secure payment transactions is use of a predefined secret such as a Personal Identification Number (PIN). Such PIN-based authentication may require input of the PIN by the cardholder, typically via a PIN pad in brick-and-mortar location. An identity thief having possession of a card or card number authenticated using a PIN is thereby prevented from using the card without knowledge of the PIN.

In the United States, PIN-based authentication systems are widely deployed for debit payment transactions. Abroad, such as in Europe, credit cards may include a smart chip that stores PIN information for use with PIN-based authentication through a point-of-sale terminal or PIN pad in retail locations.

However, even though existing PIN-based authentication systems provides enhanced security as compared to signature or other existing authentication systems, PIN-based authentication systems have disadvantages. For instance, use of a PIN pad for input requires retailers, including brick-and-mortar retailers, to purchase such hardware. Furthermore, online electronic retailers (Etailers) may not take advantage of PIN-based authentication because of the security risk associated with malware or spyware on the consumer's personal computer that may capture the PIN and/or the risk of transmitting a PIN over the Internet. Moreover, purchases made over the phone may not be desirable because a cardholder may not wish disclose a PIN to an operator, for example.

Furthermore, recurring payment transactions present security risks because bank account information and personal details entered online may be captured by spyware/malware and these details stored on biller computers may not be secured and could be compromised. For example, giving a biller account information so that the biller may charge or otherwise regularly process payments may be risky. Another problem is that a payor often forgets about their recurring bills or doesn't proactively confirm amounts to be billed and can experience overdraft charges from their bank or refused payments, or otherwise loses control of recurring payment transactions.

Existing systems suffer from these and other problems.

SUMMARY OF THE INVENTION

According to various implementations of the invention, various systems and methods may address these and other drawbacks of existing systems. According to various implementations of the invention, various systems and methods may facilitate secure payment transactions by receiving first identification information such as, for example, a payment card (e.g., credit card or debit card) number, for a payment transaction over the Internet, identifying a payor based on the first identification information, and calling the payor via an automated Interactive Voice Response (IVR) system to prompt for and receive second identification information such as, for example, a personal identification number (PIN) for the payment card. In other words, the first identification information may be entered by the payor in one communication channel and the second identification information may be prompted for and received on another communication channel. In this manner, even when the security of the first identification information is compromised, the payment transaction remains secure because the PIN, for example, is not communicated with the first identification information.

According to various implementations of the invention, various systems and methods may facilitate recurring payment transactions by retrieving account information of a payor that includes, among other things, a payment date and contact information of the payor and by calling the payor using the IVR on or before the payment date to gather approval information (such as, for example, a secret password) from the payor. In this manner, the payor may be reminded of and approve the recurring payment transaction over the telephone, for example. Likewise, in the recurring bill payment example, a secret code or word may be preselected by the payor, and the IVR may speak this secret code or word. In this manner the payor may verify that the IVR call has been made by an authorized biller or otherwise trusted source.

By leveraging a combination of novel processes and critical information, across an automated IVR system and Hardware Security Module (HSM) to prompt for, receive, and encrypt the second identification information, system 100 may securely facilitate authentication of payment card transactions with PIN authentication without using a point-of-sale (POS) PIN pad and avoiding the security risks associated with transmitting the PIN online. Thus, Etailers, recurring billers and others may advantageously implement the system and method described herein using existing hardware (such as, for example, a user's computer and/or telephone) to authenticate payment card purchases without requiring use of POS PIN pads, payment card readers in personal computers, prompting for PIN entry in the computer, and other disadvantages of existing online and retail solutions.

Other objects and advantages of the invention will be apparent to those skilled in the art based on the following drawings and detailed description.

DETAILED DESCRIPTION

According to various implementations of the invention, various systems and methods may facilitate secure PIN-based payment transactions over the Internet by receiving payment card numbers from a payor over a first communication channel, such as, for example, over the Internet, and collecting PIN input from the payor via another communication channel by, for example, calling the payor for PIN input using an automated Interactive Voice Response (IVR) system. In this manner, even if the Internet communication channel, for example, is compromised, the PIN input may remain secure over another communication channel.

According to various implementations of the invention, various systems and methods may facilitate recurring payment transactions by initiating a communication on a communication channel to the payor (such as, for example, by calling the payor) on or before a payment date and prompting for input of authorization information by the payor. In this manner, the payor may be reminded of and approve the recurring payment transaction using a the communication channel, such as, for example, a telephone communication channel.

Figure 1:
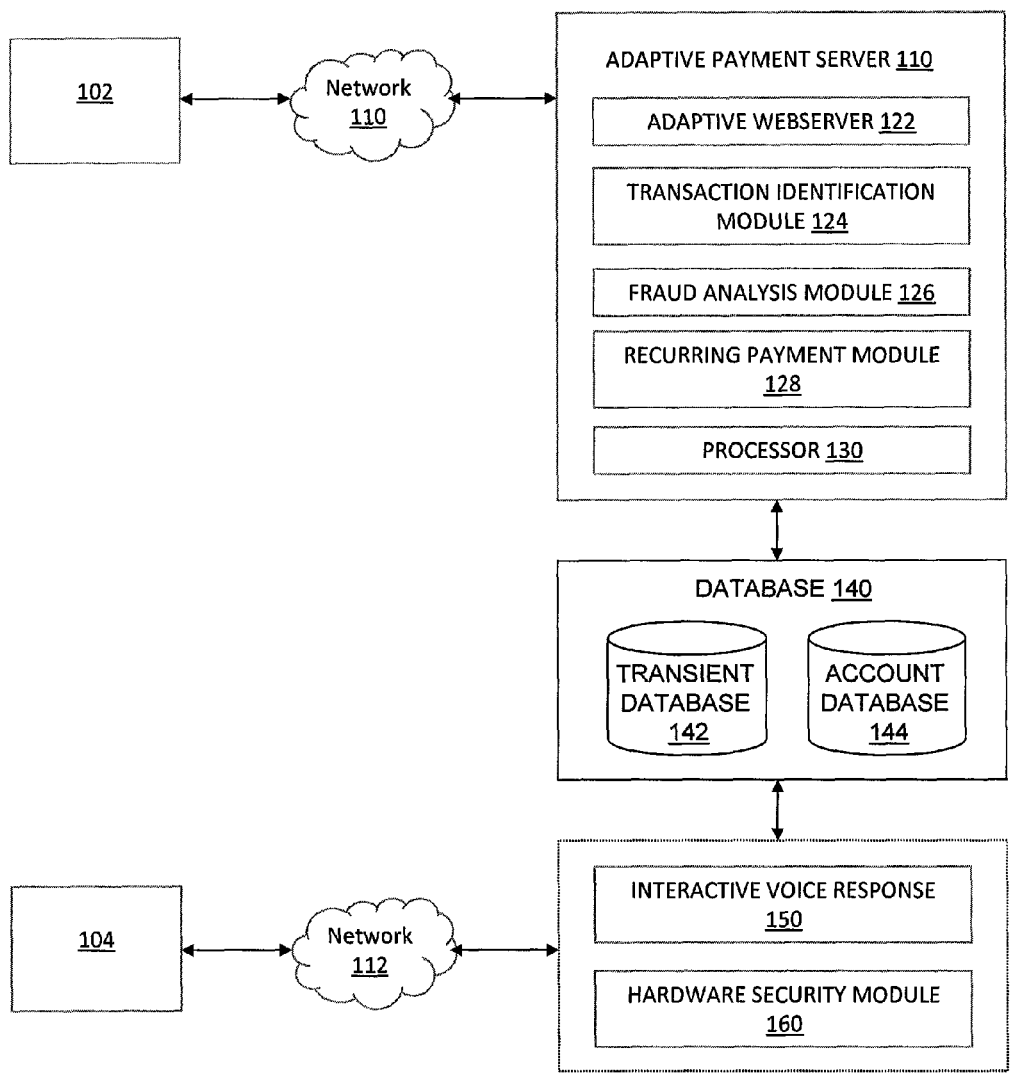
FIG. 1 is a block diagram illustrating an example of a system for processing payment transactions and recurring payments according to various implementations of the invention.

FIG. 1 is a block diagram illustrating an example of a system 100 for processing payment transactions and recurring payments according to various implementations of the invention. System 100 may include, for example, a communication device 102, a communication device 104, a network 110, a network 112, an adaptive payment server 120, a database 140, an IVR 150, and a hardware security module (HSM) 160.

According to various implementations of the invention, adaptive payment server 120 may receive the first identification information communicated from communication device 102 via network 110 on a first communication channel. The first identification information may include, among other things, a credit card number, a debit card number, a name of the cardholder (such as a name of a payor), a telephone number of the cardholder, a mailing address of the cardholder, and/or other information related to the payment transaction.

According to various implementations of the invention, the first identification information may identify a payment account. The payment account may include an online payment account, a credit and/or debit account, and/or other payment account capable of being used for a payment transaction. The payment account may be associated with a payment card, which may include, among other things, a credit card, a debit card, an electronic payment card, and/or other device that may be used to facilitate a payment transaction. According to various implementations of the invention, the payment card may include a magnetic strip, a smart chip, and/or other tangible media configured to store the first identification information and/or other information.

According to various implementations of the invention, the payment transaction may include, for instance, an online purchase, a funds transfer, and/or other transaction that transfers money and/or credit from a financial account. Using the first identification information, adaptive payment server 120 may identify communication device 104. For example, in some implementations, the first identification information may include a telephone number of communication device 104, thereby identifying communication device 104. According to various implementations of the invention, adaptive payment server 120 may query database 140 to identify communication device 104 based on the first identification information.

Adaptive payment server 120 may use or otherwise interface with IVR 150 in order to initiate a communication with communication device 104. IVR 150 may initiate a communication to communication device 104 via network 112 on a second communication channel discrete from the first communication channel. Once the communication is established, IVR 150 may prompt for and receive the second identification information from communication device 104. Thus, by using discrete communication channels to receive the first identification information and the second identification information, system 100 may facilitate secure communication of the payment transaction.

According to various implementations of the invention, upon receipt of the second identification information, IVR 150 may use or otherwise be interfaced with HSM 160 to encrypt the second identification information. Upon receipt of the first identification information and the second identification information, system 100 may initiate authentication and/or processing of the payment transaction. By receiving the first identification information and the second identification information on first and second communication channels that are discrete from one another, system 100 may facilitate secure payment transactions.

According to various implementations of the invention, examples of communication device 102 may include any one or more of, for instance, a personal computer, portable computer, personal digital assistant (PDA), workstation, web-enabled mobile telephone, WAP device, web-to-voice device, or other device. In other words, communication device 102 may include a data (or Internet) function configured to communicate data via network 110. In this manner, a payor or other entity may use communication device 102 to communicate the first identification information. The payor is a person or other entity that is a payment cardholder, a user using the system to make a payment transaction (and/or recurring payment transaction) to a payee, and/or other person or entity using the system to process a payment transaction. Those having skill in the art will appreciate that the invention described herein may work with various system configurations.

For example, a user or other entity may use communication device 102 to input the first identification information. According to various implementations of the invention, communication device 102 may store in a memory (not shown) the first identification information or otherwise facilitate retrieval of the first identification information, such as by storing web-enabled cookies that identify the payor.

According to various implementations of the invention, communication device 102 may communicate a first communication on the first communication channel (not shown) via network 110 in order to communicate the first identification information. The first communication channel may include a data channel on which data, such as the first identification information, is communicated to and from communication device 102 via network 110. "Discrete" communication channels are distinct from one another such that should the security of one channel be compromised, the other channel may remain secure. In other words, the channels may be considered to be independent from one another. For example, an Internet channel may be discrete from a telephone (i.e., voice) channel and a telephone channel may be discrete from a Short Message Service (SMS) channel. Furthermore, one telephone channel may be discrete from another telephone channel and one Internet channel may be discrete from another Internet channel.

According to various implementations of the invention, the first communication channel may include one or more Internet hypertext transfer protocol sessions (and/or other suitable data transfer protocol) that are discrete from the second communication channel. One skilled in the art would appreciate that other transfer protocols and/or other communication techniques may be used.

In this manner, should the security of the first communication on the first communication channel be compromised by, for example, a computer or network hacker, malware, spyware, and/or other security risks, information transmitted using the second communication channel may remain secure. Thus, even when the first identification information communicated over the first communication channel is compromised, the second identification information not communicated on the first communication channel may remain secure.

According to various implementations of the invention, communication device 102 may be communicably coupled to adaptive payment server 120 via network 110 such that adaptive payment server 120 may receive the first identification information from communication device 102 on the first communication channel. Network 110 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), or other network.

According to various implementations of the invention, through various modules, adaptive payment server 120 may receive the first identification information, initiate a communication to collect the second identification information, initiate authentication and/or processing of the payment transaction using the first identification information and the second identification information, initiate recurring payment transactions, and/or perform other functions to facilitate secure payment transactions. For example, adaptive payment server 120 may include, among other things, an adaptive webserver 122, a transaction identification module 124, a fraud analysis module 126, a recurring payment module 128, a processor 130 and/or other suitable modules. Processor 130 may be configured to perform one or more functions provided by adaptive payment server 120.

According to various implementations of the invention, adaptive webserver 122 may receive the first identification information from communication device 102 via network 110. In this manner, the system may use existing online retail services (such as, for example, payment card number input forms) or otherwise provide online retail services in order to receive the first identification information. Upon receiving the first identification information, adaptive webserver 122 may cause communication of a confirmation page that indicates receipt of the first identification information to communication device 102. Furthermore, the confirmation page may include an indication that a second communication on the second communication channel to communication device 104 should be expected by a user of communication device 102. For example, the confirmation page may indicate that IVR 150 will be calling the payor for PIN entry. In this manner, the payor may be notified to expect a call that will prompt for PIN input, for example.

According to various implementations of the invention, transaction identification module 124 may generate a transaction identifier for the payment transaction. The transaction identifier may be one or more words, characters, numbers, and/or other identifier that may identify the payment transaction. Furthermore, the transaction identifier may be written, typed, and/or spoken. In this manner, the transaction identifier may be used to identify the payment transaction to the payor and/or other entity.

For example, according to an implementation of the invention, upon receiving the first identification information, payment server 120 may communicate the transaction identifier to communication device 102, thereby allowing the payor or other entity using communication device 102 to identify the payment transaction in future communications. According to various implementations of the invention, the confirmation page described above may include the transaction identifier.

According to various implementations of the invention, the transaction identifier may be stored using database 140 for later retrieval by adaptive server 120 and/or IVR 150.

According to various implementations of the invention, database 140 may include, among other things, a temporary database 142 for temporarily storing transient data (i.e., data that is not stored long-term and/or data that is deleted after being used), and/or an account database 144, which may include information related to a payment account, such as, for example, credit card numbers, debit card numbers, payee contact information, payment dates, payor information, an identity of communication device 104 used by the payor, and/or other information.

According to various implementations of the invention, examples of database 140, temporary database 142, and account database 144 include, for instance, a relational database, a filesystem, and/or other device or data representation configured for data storage.

According to various implementations of the invention, adaptive payment server 120 may identify communication device 104 based on the received first identification information. For example, the first identification information may include a telephone number input by the payor. According to various implementations of the invention, adaptive payment server 120 may identify communication device 104 by performing a lookup of database 140.

According to various implementations of the invention, adaptive payment server 120 may receive a payment card number and query database 140 to determine a telephone number of the payor who owns a payment card account identified by the received payment card number. The lookup may be a structured query language (SQL) query, lightweight directory access protocol (LDAP) query, and/or any other known methods of querying database 140. In this manner, by storing an identifier (such as the telephone number in the preceding example) that identifies communication device 104 and the first communication information (such as the payment card number in the preceding example), system 100 may be configured to initiate a communication to communication device 104 using the first identification information.

According to various implementations of the invention, adaptive payment server 120 may initiate a second communication to communication device 104 on the second communication channel in order to prompt for and receive the second identification information. For example, adaptive payment server 120 may initiate a telephone call to communication device 104. Thus, communication device 104 may include a telephone (voice) function capable of receiving and/or sending telephone calls. Communication device 104 may include, for example, a PDA, smartphone, cellular telephone, cordless telephone, landline telephone, voice over IP (VOIP) telephone, any other device that includes a telephone function, and/or other device capable of receiving the second communication.

According to various implementations of the invention, adaptive payment server 120 may initiate the telephone call via IVR 150. IVR 150 may include existing IVRs configured to initiate a telephone call a communication device that includes a telephone function (such as, for example, communication device 104), communicate information to a call recipient, interactively prompt the call recipient for input, receive the input (by touch-tone input, voice input, and/or other input mechanism), process the input, and/or perform other interactive voice functions.

According to various implementations of the invention, IVR 150 may initiate the second communication to communication device 104 on the second communication channel via network 112. Network 112 may be a Public Switch Telephone Network (PSTN), VOIP network, and/or other network or combination of networks that is configured for telephonic (voice) communication.

According to various implementations of the invention, upon establishing the second communication, IVR 150 may greet the call recipient with a greeting that identifies the nature of the telephone call. The greeting may allow the call recipient to verify the trustworthiness of the call. According to various implementations of the invention, the greeting may include, for example, an identification of IVR 150, the transaction identifier, and/or other verification information to the call recipient. The verification information may include, among other things, any combination of one or more of predefined words, letters, characters, numbers, verbal utterance by the payor, and/or other predefined verification information that allows the call recipient to verify the trustworthiness of the call.

According to various implementations of the invention, IVR 150 may prompt for and receive the second identification information from communication device 104 via the second communication channel. The second identification information may include, among other things, a predefined secret. The predefined secret may include, for example, a password, PIN, and/or other secret.

For example, the call recipient may have made an online purchase using communication device 102 by entering first identification information (e.g., a payment card number) into an Etailer's website. As previously noted, adaptive webserver 122 may communicate the transaction identifier with the confirmation page. By communicating the transaction identifier to communication device 104, the payment transaction and/or trustworthiness of the call may be identified by the call recipient.

According to various implementations of the invention, substantially immediately after receiving all or a portion of the second identification information, IVR 150 may encrypt the second identification information using HSM 160. For example, the second identification information may be a 4-digit PIN, whereupon an indication that 4-digits have been entered, HSM 160 may encrypt the 4-digit PIN. According to various implementations of the invention, IVR 150 may transiently store the received second identification information and/or the encrypted second identification information in transient database 142. According to various implementations of the invention, the second identification information and/or the encrypted second identification information is removed from transient database 142 when no longer needed in order to maintain security of the second identification information.

According to various implementations of the invention, HSM 160 may apply Triple Data Encryption Algorithm (commonly, "Triple DES") to encrypt the second identification information. As would be appreciated by those having skill in the art, other encryption algorithms may be utilized.

According to various implementations of the invention, IVR 150 may record the second communication. The recorded second communication may be stored for archival in a database such as, for example, database 140.

According to various implementations of the invention, upon receipt of the first identification information and the second identification information, adaptive payment server 120 may initiate authentication and/or payment of the payment transaction. The initiation may include, among other things, authorizing and/or settling the payment transaction with various financial networks, sending the first and the second identification information to a remote server for further payment processing, and/or taking other actions to initiate authentication and/or payment of the payment transaction.

By leveraging a combination of IVR 150 and HSM 160 to prompt for, receive, and encrypt the second identification information, system 100 may facilitate authentication of payment card transactions with PIN input, for example, without using a POS PIN pad while avoiding the security risks associated with transmitting PINs online. Thus, Etailers and others may advantageously implement system 100 using existing hardware (such as, for example, a user's computer and/or telephone) without using POS PIN pads for implementing online PIN-based payment transactions.

According to various implementations of the invention, processing the payment transaction may include multi-factor authentication originating from different data sources. For example, using a payment card number and a PIN for payment authentication may represent a two-factor authentication scheme. The data source for payment card number may be the payment card itself while the data source of the PIN may be the cardholder (e.g., the payor/call recipient in the preceding examples).

Table 1 is a list of example authentication factors, their respective data sources, and their respective capture mechanisms (where user intervention is not required to capture the factor listed in the Factor column when the corresponding Capture Mechanism column value is "Automatic").

TABLE 1

| Factor | Data Source | Capture Mechanism |
| --- | --- | --- |
| Payment Card Number | Payment Card | Manual |
| Mailing Address | Cardholder | Manual |
| IP Address | Computing Device | Automatic |
| Phone Number | Phone | Automatic |
| Payment Card PIN | Cardholder | Manual |
| GPS Location | Phone | Automatic |
| Voice recording | Cardholder | Manual |
| Transaction Identifier | System | Automatic |

The values listed in Table 1 are non-limiting examples according to various implementations of the invention. Other factors, data sources, capture mechanisms and combinations of the foregoing are contemplated.

According to various implementations of the invention, adaptive payment server 120 may use one or more authentication factors, or any combination thereof, to authenticate the payment transaction or otherwise confirm an identity of a user's identity. Authentication factors may be authenticated by comparing observed (e.g., input) information to expected (e.g., predefined) information. "Observed" information indicates that the information related to a factor was manually entered or automatically captured during processing of the payment transaction. "Expected" information indicates that the information related to a factor has been predefined or can be determined for comparison to observed information such that a non-match may indicate a fraudulent or otherwise suspect payment transaction. According to various implementations of the invention, both the first identification information and the second identification information may each include one or more of these and/or other authentication factors.

According to various implementations of the invention, adaptive payment server 120 may use the authentication factors in addition to processing a payment transaction using discrete communication channels, thereby providing enhanced security when processing a payment transaction.

According to various implementations of the invention, the authentication factors may include a payment card number. The authenticity of the payment card number may be verified. For example, a payor may enter the payment card number using an Etailer's website when making a purchase. Adaptive payment server 120 may verify the authenticity of the payment card number.

According to various implementations of the invention, the authentication factors may include a mailing address of the cardholder. The authenticity of the mailing address may be verified. Thus, a person without knowledge of the mailing address may be prevented from making a payment transaction.

According to various implementations of the invention, the authentication factors may include an Internet Protocol (IP) address of a computing device such as, for example, communication device 102. By capturing the IP address of the computing device that is used to attempt a payment transaction, adaptive payment server 120 may compare the observed IP address that was captured to an expected IP address of a cardholder. The IP address comparison may be a literal comparison, a geographic comparison, and/or other suitable IP address comparison. For example, the literal comparison may directly compare observed and expected IP addresses. The geographic comparison may identify geographic regions identified by an IP address. In this manner, the payment transaction may be suspect if originating from a computing device in Europe when the cardholder resides in the U.S.

According to various implementations of the invention, the authentication factors may include a telephone number. For example, the telephone number may identify communication device 104. According to various implementations of the invention, the telephone number may be input in a website of an Etailer when attempting an online purchase. The telephone number may be used to provide further authentication by performing a telephone number comparison. The telephone number comparison may be a literal comparison, a geographic comparison, and/or other suitable telephone number comparison. For example, the literal comparison may directly compare observed and expected telephone numbers. The geographic comparison may identify geographic regions identified by the telephone number (such as, for example, by country code, area code, and/or Global System for Mobile communications (GSM) information from the telephone). In this manner, the payment transaction may be suspect if an observed telephone number originates from Europe when the cardholder resides in the U.S.

According to various implementations of the invention, the authentication factors may include a payment card PIN (or other predefined secret information). As previously noted, PIN-based authentication may provide robust security. Thus, the PIN may be a reliable method of user identification and/or payment authentication.

According to various implementations of the invention, the authentication factors may include GPS location information. For example, adaptive payment server 120 may use GPS location information from communication device 102 and/or from communication device 104. The GPS location information may be used to compare observed GPS location information to expected GPS location information. In this manner, a payment transaction originating from a geographic region outside an expected geographic region may be deemed fraudulent or otherwise suspect.

According to various implementations of the invention, the authentication factors may include voice authentication. Voice authentication may include verification of an input voice utterance with a recording of a voice utterance by the cardholder. The recording may be stored in a database (such as, for example, database 140). Adaptive payment server 120 may receive an input utterance by a user attempting a payment transaction. According to various implementations of the invention, IVR 150 may prompt a call recipient, for example, for the input voice utterance. In this manner, known methods of sound comparison may be used to further authenticate the payment transaction or otherwise identify the cardholder.

According to various implementations of the invention, the authentication factors may include a transaction identifier. As previously noted, the transaction identifier may be generated upon receipt of a request for a payment transaction (such as, for example, when a user attempts to make an online purchase using communication device 102). The transaction identifier may be used by adaptive server 120 in order to provide to a user an ability to identify a particular payment transaction. For example, adaptive payment server 120 may communicate the transaction identifier to communication device 102. By doing so, adaptive payment server 120 may then communicate the transaction identifier to the user via communication device 104, thereby allowing a user of communication device 102 and communication device 104 to verify the trustworthiness of the communication to communication device 104.

According to various implementations of the invention, adaptive payment server 120 may facilitate secure payment transaction processing with two or more authentication factors from two or more independent data sources, thereby further enhancing security as compared to less than two factors of identification and/or authentication. Any combination of factors may be used. Whichever particular combination is used, adaptive payment server 120 may observe information related to each factor and compare the observed information to expected information.

According to various implementations of the invention, for example, adaptive payment server 120 may receive a first authentication factor (such as, for example, a payment card number) for a payment transaction over the Internet, receive second authentication factor (such as, for example, a telephone number), identify a payor based on the first authentication factor with supplemental identification from the telephone number, and call the payor via IVR 150 using the telephone number. Adaptive payment server 120 may communicate a third authentication factor (such as, for example, a transaction identifier that is communicated to communication device 102 during the payment or checkout process). If the transaction identifier is accepted by the payor, IVR 150 may prompt for and receive a fourth authentication factor (such as, for example, a PIN for the payment card).

The second authentication factor may be used to aid in the confirmation of a person's identity and/or used to confirm a location (by country code, area code or GSM in the phone) which may be used to detect fraud and protect consumers. The third authentication factor may be a transaction identifier such as, for example, an order number, reference number and/or other transaction identifier that may be viewed via communication device 102 by the payor. The transaction identifier may be spoken by IVR 150 to the payor (or otherwise be communicated to communication device 104) so that the payor can confirm that the call is not a random or suspect call, but rather is from a trusted source.

In other words, according to various implementations of the invention, the first authentication factor may be entered by the payor in one communication channel and the second authentication factor may be expressed through the same communication channel to tie the transaction to the call by IVR 150 and the payor. The second authentication factor, while communicated over the same communication channel, may be used to identify the payor and initiate the second channel, such as, for example, a telephone call. When IVR 150 calls the payor, IVR 150 may speak (or otherwise communicate) the third information so the payor can tie the phone call to the Internet transaction. Thereafter, the payor may input the fourth identification information (such as, for example, the PIN) using communication device 104. According to this implementation, multiple authentication factors may be used to secure the payment transaction: the payment card number, computer/IP address details, the phone number and confirmation of validity by a telephone call, and the payment card PIN—deployed across two communication channels and input devices such as a personal computer connected to the Internet and a mobile phone across a direct dialed telephone line. In this manner, even when the security of the first identification information is compromised, the payment transaction remains secure because the second identification information (such as, for example, the PIN) is not communicated with the first identification information.

According to various implementations of the invention, a five-factor authentication using card number, mailing address, IP address, telephone number, and card PIN may be used. In this implementation, observed values of each of the input card number, mailing address, IP address, telephone number, and card PIN are compared to their respective expected values in order to authenticate the payment transaction. Thus, for example, in some implementations, an identity thief who uses a computing device that does have an IP address that matches the expected IP address associated with an authentic payment transaction may be prevented from executing the payment transaction (such as an online purchase that the identity thief is attempting to procure). In this manner, by using multi-factor authentication, adaptive payment server 120 may provide additional security when processing a payment transaction as compared to existing payment systems.

According to various implementations of the invention, adaptive payment server 120 may perform fraud analysis of the payment transaction. For example, fraud analysis module 126 may receive fraud analysis information to perform fraud analysis. The fraud analysis information may include, among other things, the authentication factors (which may include, for instance, the first identification information and the second identification information) and/or other information to perform fraud analysis. The fraud analysis may include scoring the transaction to determine a likelihood of fraudulent activity based on the fraud analysis information. In other words, fraud analysis module 126, discussed in further detail in FIG. 3, may generate a fraud score that identifies the likelihood of fraudulent activity.

According to various implementations of the invention, adaptive payment server 120 may facilitate a secure recurring payment transaction. For example, the payor may have set up one or more recurring payments to be made using one or more payment methods, such as, for example, payment by payment card. Through various modules, adaptive payment server 120 may retrieve account information for a payor, identify communication device 104 of the payor, initiate a communication to communication device 104 in order to prompt for and receive approval information, and determine whether to initiate the recurring payment. In this manner, adaptive payment server 120 may remind the payor of an upcoming recurring payment transaction to be made as well as provide a secure approval process for the recurring payment transaction by the payor.

For example, recurring payment module 128 may retrieve account information of the payor from account database 144. The account information may include, among other things, a payment date, a payment amount, an identification of communication device 104 used by the payor, an account identifier, the verification information, payee information (including, for example, name of the payee, telephone number of the payee, account receivables numbers, etc.), approval information, and/or other suitable information related to the account. The approval information may be predefined by the payor in order to approve recurring payments as described below. The approval information may include, for example, a predefined secret such as a PIN, and/or other information that may be input by the payor to approve a recurring payment. Generally, the approval information may be stored along with the account information unless the approval information is a PIN or other predefined secret that should not be stored in long-term storage for security reasons.

According to various implementations of the invention, recurring payment module 128 may identify communication device 104 using the account information. On or before the payment date, recurring payment module 128 may initiate a communication to communication device 104.

According to various implementations of the invention, once the communication is established, the greeting described above with regard to IVR 150 may be presented to the payor through communication device 104. In this example, the greeting may communicate that a recurring payment is to be made. At least a portion of the account information may be communicated to communication device 104, which may allow the payor to identify the recurring payment transaction. For example, an account identifier, payment amount, and/or payment date may be communicated to communication device 104. Furthermore, according to various implementations of the invention, the verification information described above may be communicated to communication device 104. According to various implementations of the invention, the verification information may include the verbal utterance described above. In this manner, the payor receiving the communication via communication device 104 may verify the trustworthiness of the communication.

According to various implementations of the invention, recurring payment module 128 may receive the approval information. Using the received approval information, recurring payment module 128 may determine whether to initiate payment of the recurring payment transaction. For example, the approval information may include a PIN that is input by the payor such that the determination may include PIN authentication. According to various implementations of the invention, the received approval information may include information that is stored in account database 144, whereupon the determination may include a comparison of the received approval information and the stored approval information such that a match may cause initiation of payment of the recurring payment transaction.

According to various implementations of the invention, once the determination is made, recurring payment module 128 may initiate payment of the recurring payment transaction based on the determination. As previously noted in the preceding examples, the determination may include whether the PIN was authenticated or whether a match between the received approval information and the stored approval information was found. If, based on the determination, the recurring payment transaction is not approved the recurring payment transaction may not be initiated. According to various implementations of the invention, recurring payment module 128 may notify the payor, the payee, and/or other interested party whether payment of the recurring payment transaction has been initiated. The notification, which may include a receipt of the payment transaction, may be made via electronic mail, telephone call using IVR 150, and/or other method of communication.

According to various implementations of the invention, communication device 104 may include a telephone function and may be identified by a telephone number. Further, recurring payment module 128 may use IVR 150 and HSM 160, as previously described with regard to processing a payment transaction, in order to prompt for and retrieve the approval information for approval of the recurring payment transaction.

According to various implementations of the invention, recurring payment module 128 may provide a "hot transfer" function. The hot transfer function may allow the payor to interrupt and transfer the communication to the payee. For example, upon establishing the telephone call with the payor for the recurring payment transaction, recurring payment module 128 may allow the payor to interrupt the telephone call and transfer the call to the payee. Thus, adaptive server 120 allows the payor to choose to handle the recurring payment transaction with the payee.

According to various implementations of the invention, adaptive payment server 120 may interface recurring payment module 128 with adaptive webserver 122, which may integrate with online entities (such as entities that make and/or receive payments related to the recurring payment transaction). In this manner, for example, the payor may enroll in the recurring payment transaction using webservices provided by system 100, the payor's banking systems, the payee's banking systems, and/or other financial systems.

Although illustrated using two communication devices 102 and 104, according to various implementations of the invention, other configurations of system 100 including different numbers of communication devices may be used. For example, according to various implementations of the invention, system 100 may be configured to operate using a single communication device (not shown). According to various implementations of the invention, the single communication device may include both a data function and a telephone function such as, for example, an Internet-capable telephone. In this example, the single communication device may transmit first identification information over the Internet using its Internet function and be called by IVR 150 to communicate second identification information using its telephone function. In other words, according to various implementations of the invention, communication device 102 and communication device 104 may be the same device or may be different devices.

Although communication devices 102 and 104 in examples described herein are respectively described as including Internet and telephone functions, according to various implementations of the invention, communication devices 102 and 104 may include other combinations of communication functions. For example, SMS messaging functions may be used to communicate the first identification information and/or the second identification information. According to various implementations of the invention, adaptive payment server 120 may initiate the second communication via SMS message to communication device 104 in order to prompt for and receive the second identification information. According to various implementations of the invention, a payor may input the first identification information via a telephone (such as when making a purchase via telephone) and also be called on the same or different telephone to input the second identification information. According to various implementations of the invention, the payor may use a payment card at a brick-and-mortar establishment (such as, for example, by sliding the payment card through an existing card reader), whereupon adaptive payment server 120 may initiate a communication for input of the second identification information (such as, for example, by calling the payor for PIN input).

Although illustrated as part of adaptive payment server 120, adaptive webserver 122 may be a standalone webserver providing webservices for adaptive payment server 120. Furthermore, according to various implementations of the invention, adaptive webserver 122 may receive the first identification information from a webservice (not shown) of an Etailer or other entity. In this manner, adaptive webserver 122 may provide an interface to various Etailers and others that receive first identification information from communication device 102 when processing, for example, a payment transaction. According to various implementations of the invention, adaptive webserver 122 may include servlets, proxy servers, and/or other functions that run locally at or are otherwise communicably coupled to a webservice of an Etailer or other entity in order to receive the first identification information.

Figure 2:
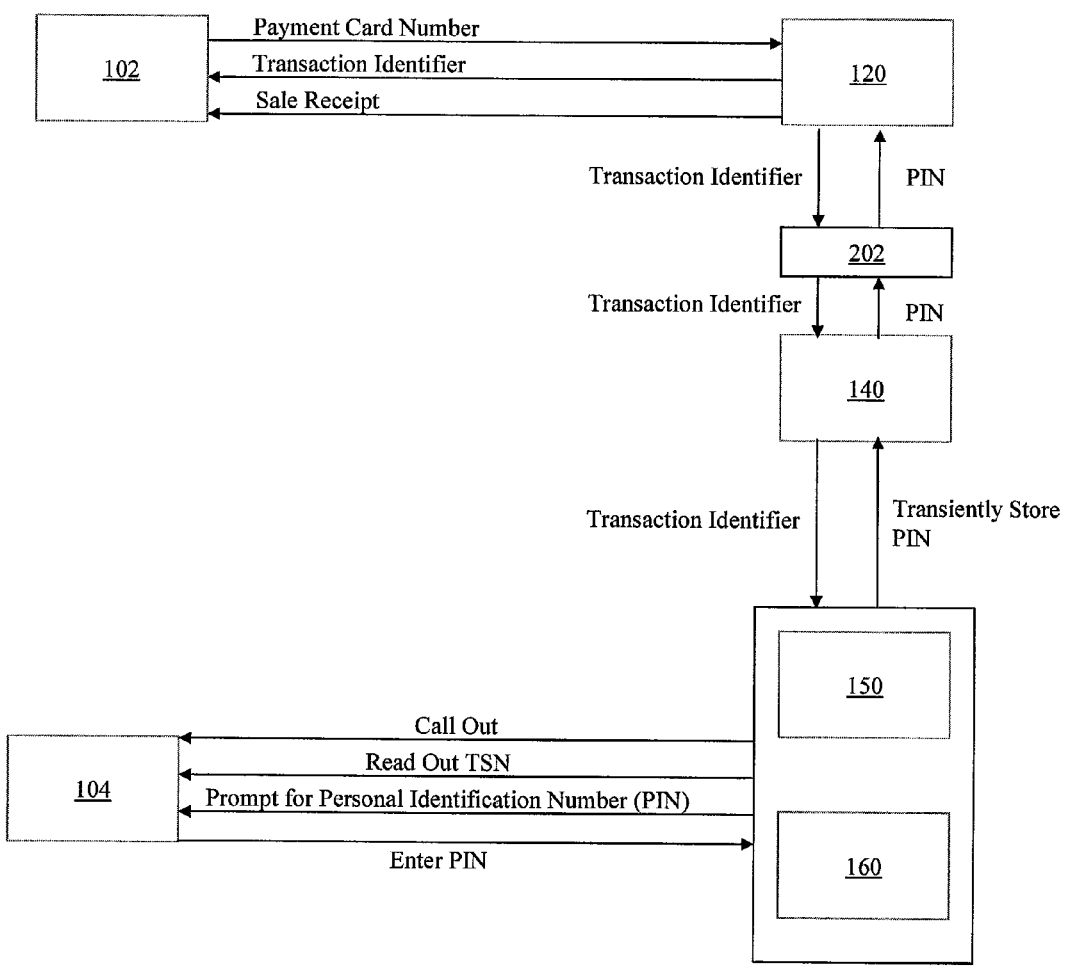
FIG. 2 is a diagram illustrating an example flow of data in an example system for processing a payment transaction according to various implementations of the invention.

FIG. 2 is a data flow diagram illustrating an example flow of data in system 100 for processing a payment transaction according to various implementations of the invention. In this example flow, adaptive payment server 120 is shown being protected by one or more firewalls 202. The data flow shown in FIG. 2 and other data flow diagrams described herein are non-limiting examples. As would be appreciated by those having skill in the art, other configurations and flows of data may be used.

According to various implementations of the invention, in an example operation, a payor may visit a website of an Etailer (not shown) and select an item to purchase using communication device 102. The Etailer may present a checkout page, on which the payor inputs a payment card number. The payment card number may be communicated to adaptive payment server 120. Adaptive payment server 120 may generate a transaction identifier and communicate to communication device 102 a confirmation page that includes the transaction identifier, which may be stored using database 140. The confirmation page may indicate to the payor that a telephone call should be expected for PIN input.

According to various implementations of the invention, the adaptive payment server 120 may identify the payor's communication device 104 using the first identification information. For example, the first identification information may include a telephone number of communication device 104. According to various implementations of the invention, adaptive payment server 120 may identify communication device 104 by matching the received payment card number to database 140, which may include the payor's telephone number. Adaptive payment server 120 may use IVR 150 to initiate a call out (i.e., an automated interactive telephone call) to the payor's communication device 104 using the identified telephone number.

According to various implementations of the invention, IVR 150 may identify itself and/or the transaction by communicating a greeting, which may include the transaction identifier. IVR 150 may prompt for the payor's PIN number. Upon receipt of the PIN number from the payor using communication device 104, IVR 150 may use HSM 160 to encrypt the PIN and may transiently store, using database 140, the encrypted PIN until no longer needed (such as when the payment transaction is complete and/or sent for collection).

According to various implementations of the invention, adaptive payment server 120 may initiate authorization and/or settlement of the payment transaction. In some implementations, adaptive payment server 120 may communicate a sale receipt to the payor. The sale receipt may be communicated by electronic mail, for example.

As previously noted, using discrete communication channels may protect the second identification information even if security of the first identification information is compromised. In this example operation, because the payment card number is input over the Internet while the PIN is input using a telephone line, a hacker, spyware, malware, or other security risk compromising the payment card number does not have access to the PIN, thereby reducing security risks associated with online purchases using PIN-based authentication.

Figure 3:
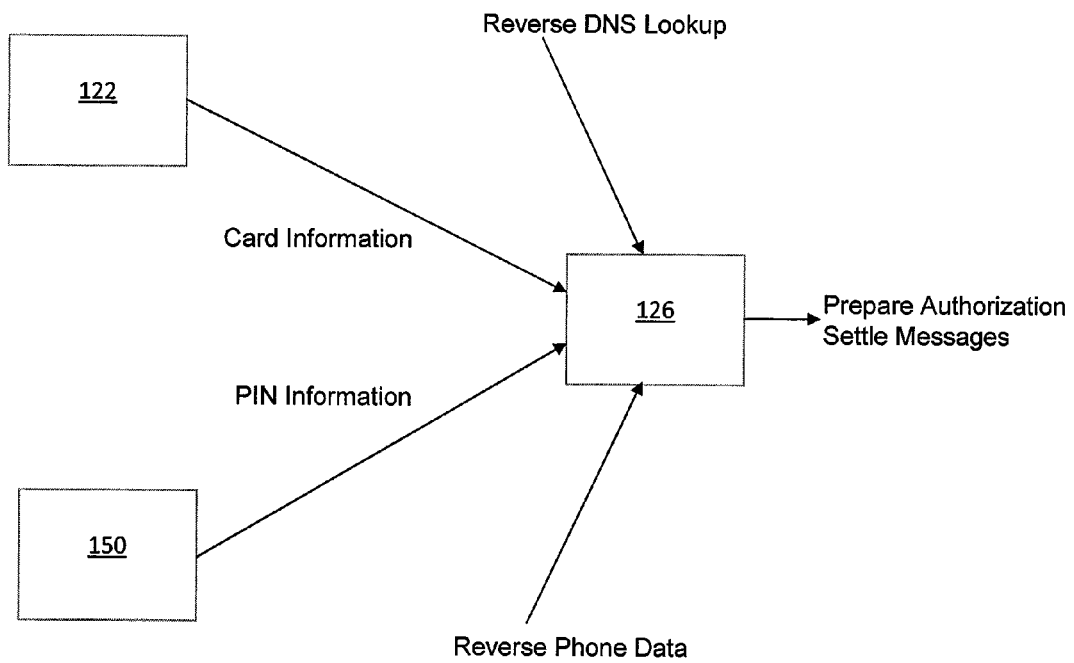
FIG. 3 is a data flow diagram illustrating an example flow of data of a fraud analysis module according to various implementations of the invention.

FIG. 3 is a data flow diagram illustrating an example flow of data of fraud analysis module 126 according to various implementations of the invention.

According to various implementations of the invention illustrated in FIG. 3, fraud analysis module 126 may receive information from one or more data sources and perform fraud analysis on the received information. The received information may include, for example, credit card information from various webservices (such as Etailer webservices and/or adaptive webserver 122), PIN information from IVR 150 and/or HSM 160, reverse Domain Service Name (DNS) Lookup data, reverse Telephone Lookup data, and/or other information (such as authentication factors listed in Table 1). For example, fraud analysis module 126 may perform reverse DNS lookup to physically determine a location of a customer's computer (such as, for example, communication device 102) on the Internet. Similarly, fraud analysis module 126 may use reverse Telephone Lookup data, which may originate from a webservice (such as a third party webservice not shown), to determine a location of a telephone. For example, fraud analysis module 126 may determine fraudulent or otherwise suspicious activity for a payment transaction originating from Europe or China using a payment card that is issued in the U.S. Through fraud analysis module 126, for example, system 100 may generate a fraud score that indicates a level of likelihood that the payment transaction is fraudulent or otherwise suspect.

According to various implementations of the invention, the fraud score of a payment transaction may be parameter driven and may utilize rule based applications. The fraud score may be a numeric, text, and/or other value that indicates a range of likelihood that a payment transaction is fraudulent. According to various implementations of the invention, the fraud score may range from 1 to 100, where 100 indicates a highly trusted payment transaction (i.e., low probability of fraud). This example is non-limiting and other configurations, ranges, and values are contemplated.

According to various implementations of the invention, when different elements of authentication correspond to one other, the transaction may be determined to be a non-fraudulent transaction (and therefore result in a relatively higher fraud score in the previous example range).

According to various implementations of the invention, fraud analysis module 126 may determine one or more bins. For example, a negative bin and a positive bin of the customer base may be determined such that non-fraudulent experiences with a card number may be binned to the positive bin. On the other hand, if a payment card is determined to be lost or stolen, based on other data present in a fraud database (such as a database not shown in database 140), the payment card and/or payment account associated with the payment card may be binned in the negative bin.

According to various implementations of the invention, other information such as, for example, periodic usage, dollar limits, and/or other transaction information may be used to enhance the security of the overall payment system. For example, neural network such as analytics applied to the fraud database over time may be used to detect stolen or lost payment card numbers or otherwise proactively identify fraudulent or suspect payment transactions.

According to various implementations of the invention, when a threshold fraud score is triggered, fraud analysis module 126 may cause adaptive payment server 120 to attempt to validate other authentication data before allowing the transaction to go forward. For example, adaptive payment server 120 may prompt for one or more additional authentication factors (such as, for example, authentication factors listed in Table 1 above) for further processing.

According to various implementations of the invention, fraud analysis module 126 may prepare authorization and/or settlement messages.

Figure 4:
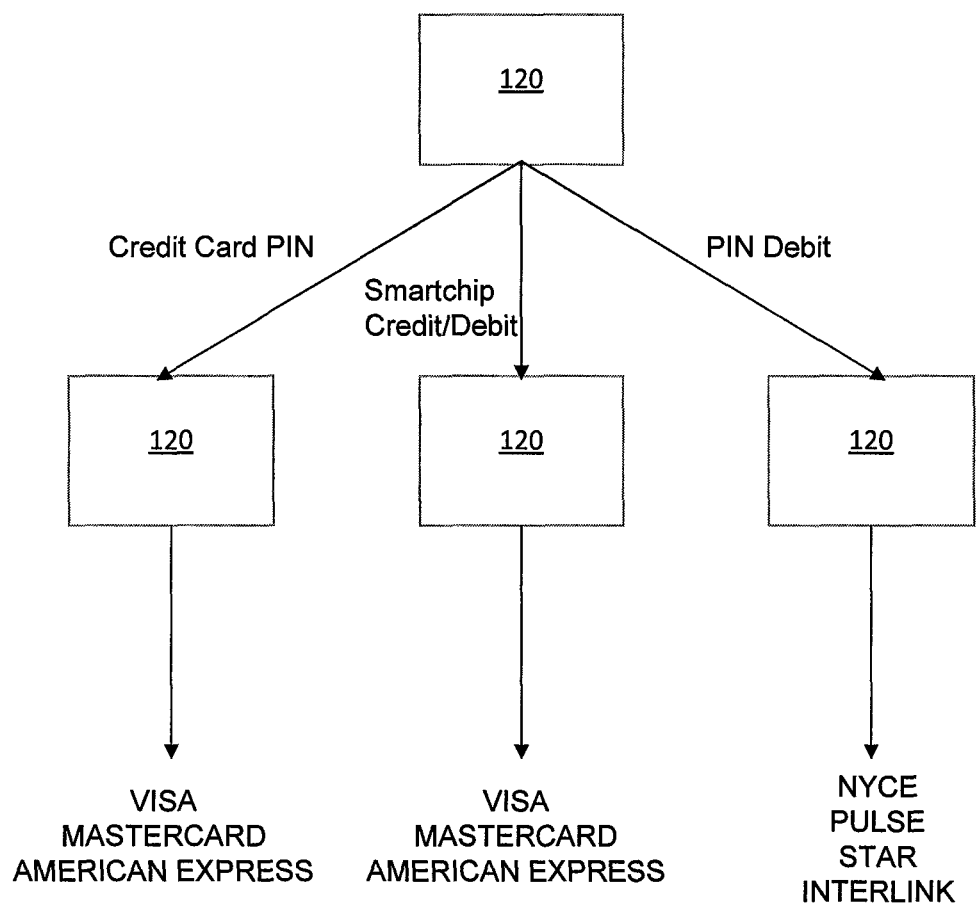
FIG. 4 is a data flow diagram illustrating an example flow of data of an adaptive payment server initiating authorization and/or settlement of a payment transaction according to various implementations of the invention.

FIG. 4 is a data flow diagram illustrating an example flow of data of adaptive payment server 120 initiating authorization and/or settlement of a payment transaction according to various implementation so the invention. The data flow illustrated by FIG. 4 shows examples of processing a payment transaction using various payment cards, such as, for example, a credit card with PIN authentication, a credit or debit card with smart chip and PIN authentication, and a debit card with PIN authentication.

According to various implementations of the invention, adaptive payment server 120 may initiate authorization and settlement with respective financial networks and/or entities according to the payment card being authenticated. For instance, a payment transaction authenticating the credit card with PIN authentication and/or the credit card or debit card with smart chip and PIN authentication may be authorized and settled with VISA, MASTERCARD, AMERICAN EXPRESS, other card services, and/or financial services entities. A payment transaction authenticating the debit card with PIN authentication may be authorized and settled with various debit networks such as, for example, NYCE, PULSE, STAR, INTERLINK, and others.

Thus, adaptive payment server 120 may be communicably coupled to a variety of financial networks, financial institutions, and/or other entities that authorize and settle payment transactions using payment cards. In this manner, adaptive payment server 120 may provide processing of payment transactions using a robust array of payment cards and the respective financial institutions that issue, authorize, and settle payments originating from use of the payment cards.

Figure 5:
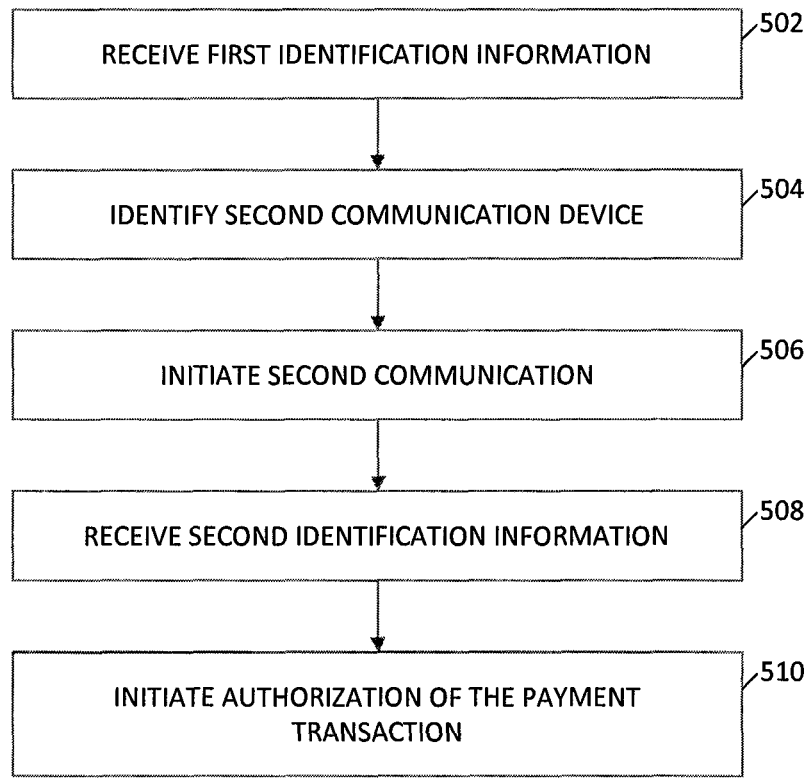
FIG. 5 is a flow diagram illustrating an example of a process of processing a payment transaction according to various implementations of the invention.

FIG. 5 is a flow diagram illustrating an example process 500 of processing a payment transaction according to various implementations of the invention. The various processing operations depicted in the flow diagram of FIG. 5 (and in the other drawing figures) are described in greater detail herein. The described operations for a flow diagram may be accomplished using some or all of the system components described in detail above and, in some implementations, various operations may be performed in different sequences. In some implementations, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

According to various implementations of the invention, in an operation 502, first identification information may be received from a first communication device (such as, for example, communication device 102) on a first communication channel in relation to a payment transaction. The first communication channel may be on a data network such as, for example, the Internet, and/or any other network or combinations of networks capable of communicating the first identification information. The first identification information may include, among other things, a payment card number, and/or other identification information related to the payment transaction. For example, a payor may have visited a website of an Etailer and may have selected an item to purchase using the first communication device. The Etailer or other entity may present a checkout page, on which the payor inputs the first identification information, including, for instance, a payment card number.

In an operation 504, a second communication device (such as, for example, communication device 104) may be identified. The second communication device may include, for example a telephone function that is configured to send and/or receive a second communication on a second communication channel that is discrete from the first communication channel. The identification may be made because the first identification information may include a telephone number of the second communication device. According to various implementations of the invention, the identification may be made by querying a database (such as database 140) using the received payment card number to identify the payor's telephone number.

In an operation 506, the second communication may be initiated to the second communication device on the second communication channel, which is discrete from the first communication channel.

In an operation 508, second identification information may be received based on the initiated second communication. The second identification information may include, for example, a predefined secret, which may include a PIN. According to various implementations of the invention, substantially immediately after receipt of all, or a portion, of the second identification information, the second identification information may be encrypted and/or transiently stored using a database (such as, for example, transient database 142). For example, the second identification information may be a 4-digit PIN, whereupon an indication that 4-digits have been entered, HSM 160 may encrypt the 4-digit PIN. According to various implementations of the invention, Triple Data Encryption Algorithm (commonly, "Triple DES") may be applied to encrypt the second identification information. Other encryption algorithms may be applied. According to various implementations of the invention, the second identification information and/or the encrypted second identification information may be removed from transient database 142 in order to maintain security of the second identification information.

In an operation 510, based on the received first and the received second identification information, authorization and/or settlement of the payment transaction may be initiated.

Figure 6:
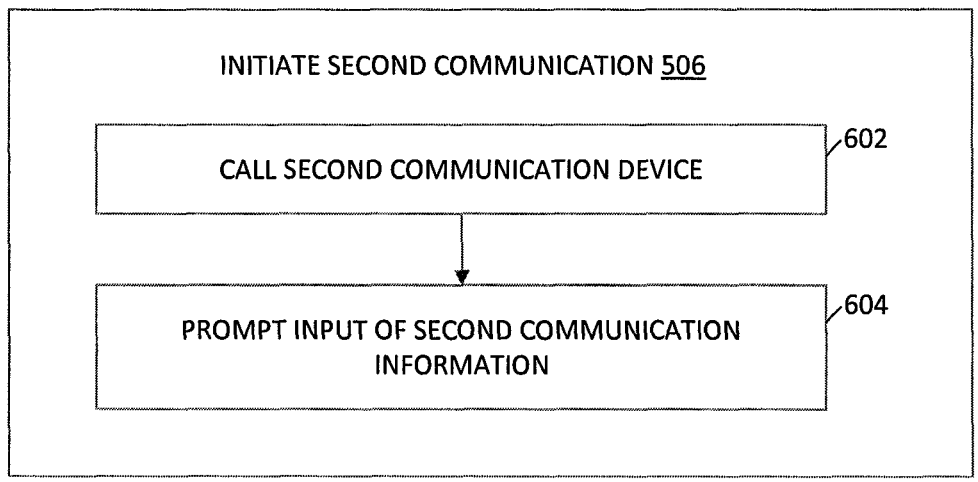
FIG. 6 is a flow diagram illustrating an example of a process of initiating a communication with a communication device when processing a payment transaction according to various implementations of the invention.

FIG. 6 is a flow diagram illustrating an example process 506 of initiating a communication with communication device 104 when processing a payment transaction according to various implementations of the invention. For example, an IVR (such as, for instance, IVR 150) may be used to initiate a call out (i.e., an automated interactive telephone call) to the second communication device using the identified telephone number. When the second communication (such as, for example, the automated interactive telephone call) has been established, process 506 may prompt a call recipient (such as, for example, the payor) to input the second identification information. For example, the call recipient may be prompted to enter a debit PIN.

According to various implementations of the invention, the call recipient may be informed of the nature of the call. For example, the transaction identifier described above may be communicated to the call recipient. As previously noted, the transaction identifier may be included in a confirmation page communicated to communication device 102. As such, a user of communication device 102 receiving the call on communication device 104 may verify the trustworthiness of the call.

Figure 7:
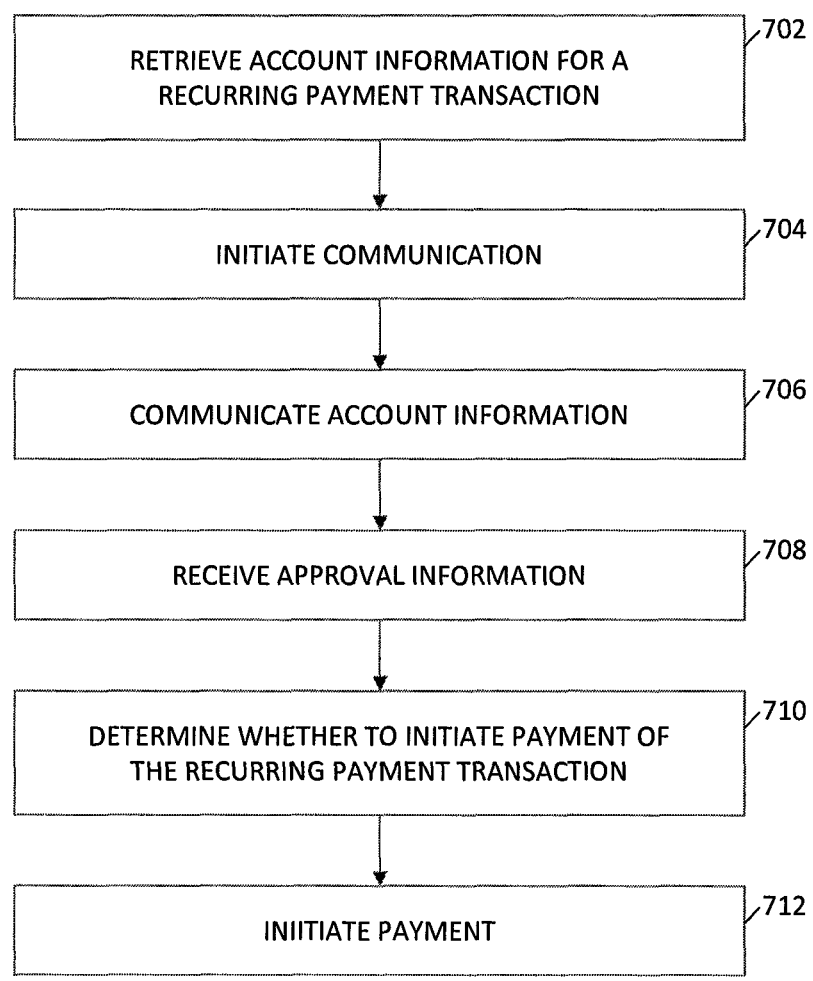
FIG. 7 is a flow diagram illustrating an example of a process of a recurring payment transaction according to various implementations of the invention.

FIG. 7 is a flow diagram illustrating an example process 700 of a recurring payment transaction according to various implementations of the invention.

In an operation 702, account information of a payor of the recurring payment transaction may be retrieved from a database (such as, for example, account database 144). The account information may include, among other things, a payment date, a payment amount, an identification of a communication device (such as, for example, communication device 104) used by the payor, an account identifier, the verification information described above, payee information (including, for example, name of the payee, telephone number of the payee, account receivables numbers, etc.), approval information, and/or other suitable information related to the account. The approval information may be predefined by the payor in order to approve recurring payments as described below. The approval information may include, for example, a predefined secret such as a PIN, and/or other information that may be input by the payor to approve a recurring payment. Generally, the approval information may be stored along with the account information unless the approval information is a PIN or other predefined secret that should not be stored in long-term storage for security reasons.

In an operation 704, a communication to the communication device may be initiated on or before the payment date. For example, the communication device may include a telephone (voice) function and the communication may be a voice communication made by an automated IVR (such as, for instance, IVR 150).

According to various implementations of the invention, once the communication is established, a greeting may be presented to the payor that identifies that a recurring payment is to be made.

In an operation 706, at least a portion of the account information may be communicated to the communication device, which may allow the payor to identify recurring payment transaction. For example, an account identifier, payment amount, and/or payment date may be communicated to the communication device. Furthermore, according to various implementations of the invention, the verification information may be communicated to the communication device. According to various implementations of the invention, the verification information may include the verbal utterance described above. In this manner, the payor receiving the communication via communication device may verify the trustworthiness of the communication. According to various implementations of the invention, operation 706 may include prompting the payor for the approval information.

In an operation 708 approval information may be received. For example, the payor may input the approval information in order to approve initiation of the recurring payment transaction. According to one implementation of the invention, the approval information may be a PIN that is input by the payor.

In an operation 710, whether to initiate payment of the recurring payment transaction may be determined using the approval information. For example, the determination may include PIN authentication. According to various implementations of the invention, the received approval information may include information that is stored in a database (such as, for example, account database 144), whereupon the determination may include a comparison of the received approval information from the payor and the stored approval information from the database such that a match may cause initiation of payment of the recurring payment transaction.

In an operation 712, payment of the recurring payment transaction may be initiated based on the determination. For instance, in the preceding examples, the determination may include whether the PIN was authenticated or whether a match between the received approval information and the stored approval information was found. If, based on the determination, the recurring payment transaction is not approved the recurring payment transaction may not be initiated. According to various implementations of the invention, a notification describing whether payment of the recurring payment transaction has been initiated may be communicated to the payor, the payee, and/or other interested party. According to various implementations of the invention, the notification, which may include a receipt of the payment transaction, may be made via electronic mail, telephone call, and/or other method of communication.

Figure 8:
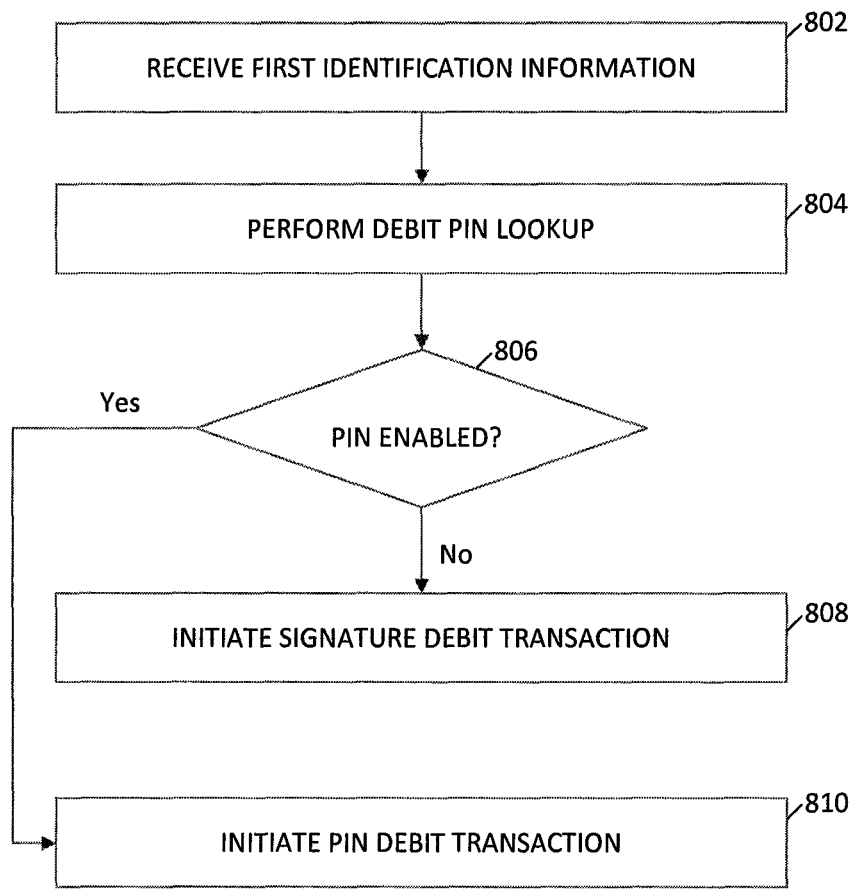
FIG. 8 is a flow diagram illustrating an example process of determining whether a payment transaction is a signature debit or a PIN debit transaction according to various implementations of the invention.

FIG. 8 is a flow diagram illustrating an example process 800 of a determining whether a payment transaction is a signature debit or a PIN debit transaction according to various implementations of the invention.

In an operation 802, first identification information may be received. In an operation 804, a debit PIN lookup may be performed in order to determine whether the first identification information is related to a payment card that is PIN-enabled. In an operation 806, if the payment card is not PIN-enabled, then in an operation 808, a signature debit transaction may be initiated. On the other hand, if in operation 806 the payment card is PIN-enabled, then in an operation 810, a PIN debit transaction may be initiated, according to various implementations of the invention described herein. In this manner, process 800 may determine whether to initiate a signature debit transaction or whether to initiate a debit PIN using, for example, systems and methods described herein.

Implementations of the invention may be made in hardware, firmware, software, or any suitable combination thereof. Implementations of the invention may also be implemented as instructions stored on a machine-readable medium, which may be read and executed by one or more processors. A tangible machine-readable medium may include any mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Intangible machine-readable transmission media may include intangible forms of propagated signals, such as carrier waves, infrared signals, digital signals, and other intangible transmission media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A method of authenticating a debit card payment transaction, comprising:
   receiving, by one or more processors of an adaptive payment server, a debit card number associated with the debit card payment transaction from a first communication device over a first communication channel;
   generating, by the adaptive payment server, a transaction identifier that uniquely identifies the debit card payment transaction;
   communicating, by the adaptive payment server, the transaction identifier to the first communication device over the first communication channel;
   identifying, by the adaptive payment server, a second communication device based on the debit card number;
   initiating, by the adaptive payment server, a second communication channel with the second communication device, wherein the first communication channel is different from the second communication channel;
   communicating, by the adaptive payment server, the transaction identifier to the second communication device over the initiated second communication channel;
   receiving, by the adaptive payment server, a Personal Identification Number (PIN) associated with the debit card number from the second communication device over the second communication channel; and
   authenticating, by the adaptive payment server, the debit card payment transaction using the debit card number and the PIN.

2. The method of claim 1, further comprising:
   encrypting the PIN after the PIN is received by the adaptive payment server.

3. The method of claim 1, wherein the first communication channel is over a data network.

4. The method of claim 1, wherein the second communication channel is a voice network.

5. The method of claim 4, wherein the voice network includes a public switched telephone network.

6. The method of claim 1, wherein the second communication device includes a telephone function, and wherein the second communication device is identified by a telephone number.

7. The method of claim 6, wherein said initiating a second communication channel further comprises:
   calling, by an interactive voice response (IVR) system associated with the adaptive payment server, the second communication device using the telephone number; and
   prompting, through the second communication device, input of the PIN.

8. The method of claim 1, wherein the first communication device and the second communication device are different devices.

9. The method of claim 1, wherein the first communication device and the second communication device is the same device.

10. A system of authenticating a debit card payment transaction, comprising:
    an adaptive payment server comprising:
    one or more processors, and non-transitory memory coupled to the one or more processors, the memory configured to store instructions that on execution by the one or more processors cause the one or more processors to perform:
       receiving receive a debit card number from a first communication device over a first communication channel;
       generating a transaction identifier that uniquely identifies the debit card payment transaction;
       communicating communicate the transaction identifier to the first communication device over the first communication channel;
       identifying identify a second communication device based on the debit card number;
       initiating initiate a second communication channel with the second communication device, wherein the first communication channel is different from the second communication channel;
       communicating communicate the transaction identifier to the second communication device over the initiated second communication channel;
       receiving receive a Personal Identification Number (PIN) associated with the debit card number from the second communication device over the second communication channel; and
       authenticating authenticate the debit card payment transaction using the debit card number and the PIN.

11. The system of claim 10, wherein the one or more processors of the adaptive payment server are further perform:
    encrypting the PIN after the PIN is received by the adaptive payment server.

12. The system of claim 10, wherein the first communication channel is over a data network.

13. The system of claim 10, wherein the second communication channel is a voice network.

14. The system of claim 13, wherein the voice network includes a public switched telephone network.

15. The system of claim 10, wherein the second communication device includes a telephone function, and wherein the second communication device is identified by a telephone number.

16. The system of claim 15, wherein initiating the second communication channel further comprises:
    calling, by an interactive voice response (IVR) system associated with the adaptive payment server, the second communication device using the telephone number; and
    prompting prompt, through the second communication device, input of the PIN.

17. The system of claim 10, wherein the first communication device and the second communication device are different devices.

18. The system of claim 10, wherein the first communication device and the second communication device is the same device.

19. The method of claim 1, further comprising:
    receiving, by the adaptive payment server, third identification information via the first communication channel or the second communication channel, the third identification information comprising one or more of: a global positioning system (GPS) information from the second communication device, a prerecorded verbal utterance from a payor, or an Internet Protocol (IP) address.

20. The method of claim 19, further comprising:
    receiving, by the adaptive payment server, fourth identification information via the first communication channel or the second communication channel, the fourth identification information comprising one or more of: a global positioning system (GPS) information from the second communication device, a prerecorded verbal utterance from a payor, or an Internet Protocol (IP) address.

21. The method of claim 20, further comprising:
- receiving, by the adaptive payment server, fifth identification information via the first communication channel or the second communication channel, the fifth identification information comprising one or more of: a global positioning system (GPS) information from the second communication device, a prerecorded verbal utterance from a payor, or an Internet Protocol (IP) address.

22. The system of claim 10, wherein the one or more processors of the adaptive payment server are further perform:
- receiving receive third identification information via the first communication channel or the second communication channel, the third identification information comprising one or more of: a global positioning system (GPS) information from the second communication device, a prerecorded verbal utterance from a payor, or an Internet Protocol (IP) address.

23. The system of claim 22, wherein the one or more processors of the adaptive payment server are further perform:
- receiving receive, by the adaptive payment server, fourth identification information via the first or the second communication channel, the fourth identification information comprising one or more of: a global positioning system (GPS) information from the second communication device, a prerecorded verbal utterance from a payor, or an Internet Protocol (IP) address.

* * * * *